US008763730B2

(12) United States Patent
Cariveau et al.

(10) Patent No.: US 8,763,730 B2
(45) Date of Patent: Jul. 1, 2014

(54) DIAMOND BONDED CONSTRUCTION WITH IMPROVED BRAZE JOINT

(75) Inventors: Peter Cariveau, Draper, UT (US); Georgiy Voronin, Orem, UT (US); J. Daniel Belnap, Lindon, UT (US)

(73) Assignee: Smith International, Inc., Houston, TX (US)

( * ) Notice: Subject to any disclaimer, the term of this patent is extended or adjusted under 35 U.S.C. 154(b) by 202 days.

(21) Appl. No.: 12/474,136

(22) Filed: May 28, 2009

(65) Prior Publication Data

US 2010/0300767 A1 Dec. 2, 2010

(51) Int. Cl.
*E21B 10/573* (2006.01)
(52) U.S. Cl.
USPC .............. 175/425; 175/434; 175/435
(58) Field of Classification Search
USPC ............ 175/434, 435, 425; 51/295; 76/108.2
See application file for complete search history.

(56) References Cited

U.S. PATENT DOCUMENTS

| 4,699,227 | A | 10/1987 | Wardley |
| 4,776,862 | A * | 10/1988 | Wiand ............................ 51/293 |
| 4,931,363 | A | 6/1990 | Slutz et al. |
| 5,032,147 | A | 7/1991 | Frushour |
| 5,037,704 | A | 8/1991 | Nakai et al. |
| 5,116,568 | A * | 5/1992 | Sung et al. ..................... 419/11 |
| 5,161,335 | A | 11/1992 | Tank |
| 5,348,108 | A | 9/1994 | Scott et al. |
| 6,234,261 | B1 | 5/2001 | Evans et al. |
| 2006/0254830 | A1 * | 11/2006 | Radtke ......................... 175/426 |
| 2006/0266558 | A1 * | 11/2006 | Middlemiss et al. ......... 175/426 |
| 2007/0131459 | A1 * | 6/2007 | Voronin et al. ............... 175/426 |
| 2008/0010905 | A1 * | 1/2008 | Eyre .............................. 51/307 |
| 2008/0223623 | A1 * | 9/2008 | Keshavan et al. ............. 175/434 |

FOREIGN PATENT DOCUMENTS

WO 0216725 A1 2/2002

OTHER PUBLICATIONS

Search Report for corresponding British Patent Application No. GB 10 07247.8 dated Sep. 23, 2010, total 5 pages.

* cited by examiner

*Primary Examiner* — David Andrews
*Assistant Examiner* — Richard Alker
(74) *Attorney, Agent, or Firm* — Novak Druce Connolly Bove + Quigg LLP

(57) ABSTRACT

Diamond bonded constructions comprise a body comprising a plurality of bonded together diamond grains with interstitial regions disposed between the grains that are substantially free of the catalyst material used to initially sinter the body. A metallic substrate is attached to the body, and a braze joint is interposed between the body and the substrate. The body is metallized to include a metallic material disposed along a substrate attachment surface in contact with the braze joint, wherein the metallic material is different from the braze joint material. The metallic material may exist within a region of the body extending fully or partially into the body, and/or may exist as a layer extending away from the substrate attachment surface. The body includes a working surface characterized by empty interstitial regions or by interstitial regions filled with an infiltrant material, wherein the infiltrant material is different from the metallizing material.

21 Claims, 9 Drawing Sheets

DIAMOND BONDED CONSTRUCTION WITH IMPROVED BRAZE JOINT

FIELD OF THE INVENTION

This invention generally relates to constructions comprising an ultra-hard component and a metallic component that are brazed together and, more particularly, to a thermally stable diamond bonded body that is specially engineered to facilitate attachment with a metallic substrate using a braze joint in a manner that provides improved attachment strength therebetween, thereby improving the effective service life of the construction formed therefrom when compared to conventional thermally stable diamond bonded constructions.

BACKGROUND OF THE INVENTION

The use of constructions comprising ultra-hard and metallic components that are joined together is well known in the art. An example of such can be found in the form of cutting elements comprising an ultra-hard component that is joined to a metallic component. In such cutting element embodiment, the wear or cutting portion is formed from the ultra-hard component and the metallic portion of the cutting element is attached to the wear and/or cutting device. In such known constructions, the ultra-hard component can be formed from a polycrystalline material such as polycrystalline diamond (PCD), polycrystalline cubic boron nitride (PcBN), or the like, that has a degree of wear and/or abrasion resistance that is greater than that of the metallic component.

In particular examples, the ultra-hard component can be PCD that has been treated so that it is substantially free of a catalyst material, e.g., a Group VIII metal from the Periodic table, that was used to form/sinter the same at high pressure/high temperature conditions, and that comprises bonded-together diamond crystals. PCD that has been rendered substantially free of the catalyst material is referred to as thermally stable polycrystalline diamond (TSP) as removal of the catalyst material has been found to improve the thermal stability of the resulting diamond body by eliminating unwanted degradation and thermal expansion mismatches that with increasing temperature can adversely impact the effective service life of the diamond body.

While TSP provides desired improvements in thermal stability, a problem known to exist with TSP is that its lack of catalyst material within the body operates to preclude subsequent attachment of the TSP body to a metallic substrate by solvent catalyst infiltration. Further, such TSP bodies have a coefficient of thermal expansion that is sufficiently different from that of conventional substrate materials (such as WC—Co and the like) that are typically infiltrated or otherwise attached to a PCD body. The attachment of such substrates to the TSP body is highly desired to provide a TSP compact that can be readily adapted for use in many desirable applications. However, the difference in thermal expansion between the TSP body and the substrate, and the poor wettability of the TSP body due to the substantial absence of the catalyst material, makes it very difficult to bond the TSP body to conventionally used substrates. Thus, some TSP bodies must be attached or mounted directly to the desired end-use device without the presence of an adjoining substrate.

It is known that TSP bodies can be attached to a desired metallic substrate through the use of a suitable braze material. However, because of the poor wettability of the TSP body, the attachment that is formed between the TSP body and the substrate by conventional brazing techniques is one that is not as strong as the attachment bond formed between conventional PCD and a metallic substrate by infiltration, thus is one that can result in diminished service life due to delamination or the like between the TSP body and the substrate.

It is, therefore, desired that constructions comprising ultra-hard and metallic components be engineered in a manner having a desired degree of thermal stability along with an improved degree of attachment strength therebetween to enable the construction to withstand use in certain demanding wear and/or cutting applications, thereby extending the service life of such constructions when compared to conventional ultra-hard and metallic constructions.

SUMMARY OF THE INVENTION

Diamond bonded constructions, prepared according to principles of the invention, comprise a thermally stable diamond bonded body having a material microstructure comprising a plurality of bonded together diamond grains with interstitial regions disposed between the diamond grains. The interstitial regions of the diamond body are substantially free of the catalyst material used to initially form/sinter the body at high pressure/high temperature conditions. The construction comprises a metallic substrate attached to the body. A braze joint is interposed between the body and the substrate, and is formed from a braze material.

A feature of the diamond bonded construction is that the body is metallized to include a metallic material disposed along a substrate attachment surface in contact with the braze joint and that is formed from a metallic material different from the braze joint. The metallic material may be disposed within a metallized region of the body extending fully through or partially into the body from the substrate attachment surface. The metallic material can additionally or alternatively exist as a layer that extends a distance outwardly from the substrate attachment surface.

The diamond bonded construction includes a working surface comprising empty interstitial regions or may optionally include an infiltrated region that extends a depth into the body from the working surface, wherein the infiltrated region includes an infiltrant material that is disposed within the interstitial regions. The infiltrant material can be selected from the group consisting of metals, metal alloys, carbide formers, and combinations thereof. In an example embodiment, the infiltrant material is different from the metallic material.

The diamond bonded construction may further include braze attachment layer extending from the attachment surface and interposed between the body metallic material and the braze material. Further, the diamond bonded construction can include a braze joint comprising a first braze material that is bonded to the body, a second braze material that is bonded to the substrate, and an intermediate layer of material that is interposed between the first and second braze materials.

Diamond bonded constructions can be made by the process of treating a diamond bonded body to introduce a metallic material onto a substrate attachment surface of the body. The diamond bonded body comprises a plurality of diamond bonded grains with interstitial regions disposed between the diamond grains. The interstitial regions being substantially free of a catalyst material used to initially form the diamond bonded body, wherein the treating step takes place at high pressure/high temperature conditions. During the step of treating, the metallic material infiltrates into the diamond bonded body to form a metallized region that extends into the body fully or a partial depth from the attachment surface.

The treated diamond body is attached to a metallic substrate by the use of a braze joint comprising one or more braze materials interposed between the substrate and a surface of the diamond bonded body comprising the metallic material.

If desired, the diamond bonded body can be further treated to introduce an infiltrant material into an infiltrated region of the diamond body extending from a working surface at high pressure/high temperature conditions. The infiltrant material is disposed within the interstitial regions within the infiltrated region. As noted above, in an example embodiment, the infiltrant material is different from the metallic material.

The step of treating to introduce the metallic material and treating to introduce the infiltrant material occurs during the high pressure/high temperature conditions. The process of making the diamond bonded construction further comprises joining a braze attachment layer to the diamond bonded body surface that has been treated to include the metallic material, wherein the step of joining takes place during the high pressure/high temperature conditions, and wherein during the step of attaching the braze material is interposed between the substrate and the braze attachment layer. In an example embodiment, the metallic material that is used is different from that used to form the braze joint.

Diamond bonded constructions can be made by assembling a number of diamond bonded bodies in one or more containers, wherein each diamond bonded body in the assembly includes the metallic material positioned adjacent the respective diamond bonded body substrate attachment surface, and placing the assembly of the diamond bodies and metallic materials into a high pressure/high temperature device for simultaneous treating.

Diamond bonded constructions as described above are well suited for use as cutting elements or inserts used with bits for drilling subterranean formations, wherein such bits include a body. The drill bits can comprise a number of fixed blades projecting outwardly from the body, wherein the cutting elements are attached along the blades, or the drill bits can comprise a number of cones that are rotatably attached to respective journals extending from the body, wherein the cutting elements are attached to the cones.

Diamond bonded constructions, prepared according to principles of the invention, are engineered having an enhanced desired degree of thermal stability along with an improved degree of attachment strength with a metallic substrate to thereby provide improved performance properties and extended service life when compared to conventional thermally stable diamond bonded constructions.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
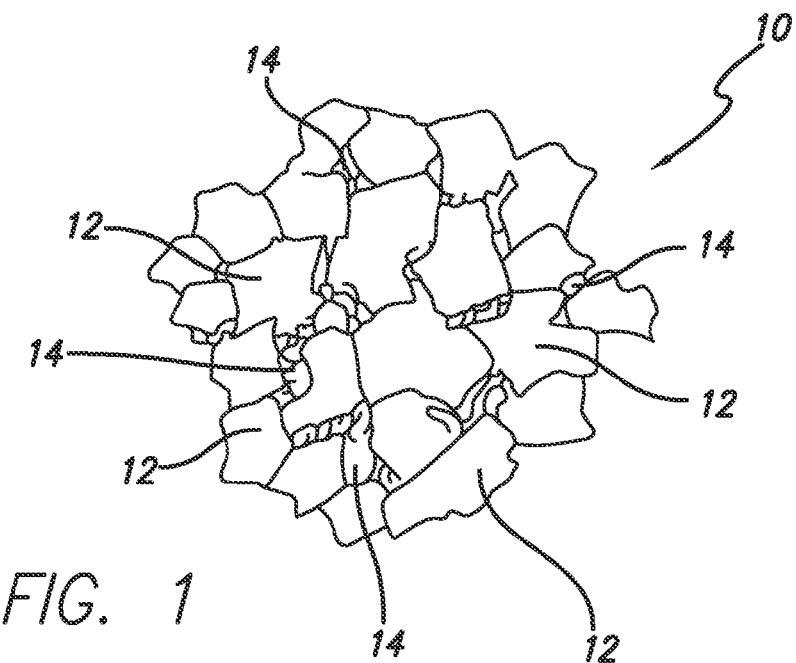
FIG. 1 is view taken from a section of a diamond bonded body after it has been treated to remove a catalyst material used to form the same therefrom.

Ultra-hard and metallic constructions of this invention comprise a thermally stable polycrystalline diamond (TSP) bonded body that is substantially free of the catalyst material that was initially used to sinter the body, and that is specially engineered to accommodate attachment with a substrate or end use device by a braze joint in a manner that provides an enhanced degree of attachment strength therewith and optionally to provide an improved degree of strength and toughness along a working surface when compared to conventional TSP constructions.

As used herein, the term "ultra-hard" is understood to refer to those materials known in the art to have a grain hardness of about 4,000 HV or greater. Such ultra-hard materials can include those capable of demonstrating physical stability at temperatures above about 750° C., and for certain applications above about 1,000° C., that are formed from consolidated materials. Such ultra-hard materials can include but are not limited to diamond, cubic boron nitride (cBN), diamond-like carbon, boron suboxide, aluminum manganese boride, and other materials in the boron-nitrogen-carbon phase diagram which have shown hardness values similar to cBN and other ceramic materials.

Polycrystalline diamond (PCD) is a useful material for forming the ultra-hard component once it has been treated to remove a catalyst material, such as the Group VIII materials noted above used to initially sinter or form the same at high pressure/high temperature (HPHT) conditions. As used herein, the term "catalyst material" refers to the material that was initially used to facilitate diamond-to-diamond bonding or sintering at the initial HPHT process conditions used to form the PCD.

TSP has a material microstructure characterized by a polycrystalline phase comprising bonded together diamond grains or crystals, and a plurality of voids or empty pores that exist within interstitial regions disposed between the bonded together diamond grains. The TSP material is initially formed by bonding together adjacent diamond grains or crystals at HPHT process conditions. The bonding together of the diamond grains at HPHT conditions is facilitated by the use of an appropriate catalyst material, such as a metal solvent catalyst selected from Group VIII of the Periodic table, thereby forming conventional PCD comprising the catalyst material disposed within the plurality of voids or pores.

Diamond grains useful for forming the TSP component or body can include natural and/or synthetic diamond powders having an average diameter grain size in the range of from submicrometer in size to 100 micrometers, and more preferably in the range of from about 1 to 80 micrometers. The diamond powder can contain grains having a mono or multimodal size distribution. In an example embodiment, the diamond powder has an average particle grain size of approximately 20 micrometers. In the event that diamond powders are used having differently sized grains, the diamond grains are mixed together by conventional process, such as by ball or attritor milling for as much time as necessary to ensure good uniform distribution.

The diamond grain powder is preferably cleaned, to enhance the sinterability of the powder by treatment at high temperature, in a vacuum or reducing atmosphere. The diamond powder mixture is loaded into a desired container for placement within a suitable HPHT consolidation and sintering device.

The diamond powder may be combined with a desired catalyst material, e.g., a solvent metal catalyst, in the form of a powder to facilitate diamond bonding during the HPHT process and/or the catalyst material can be provided by infiltration from a substrate positioned adjacent the diamond powder and that includes the catalyst material. Suitable substrates useful as a source for infiltrating the catalyst material can include those used to form conventional PCD materials, and can be provided in powder, green state, and/or already sintered form. A feature of such substrate is that it includes a metal solvent catalyst that is capable of melting and infiltrating into the adjacent volume of diamond powder to facilitate bonding the diamond grains together during the HPHT process. In an example embodiment, the catalyst material is cobalt (Co), and a substrate useful for providing the same is a Co containing substrate, such as WC—Co.

Alternatively, the diamond powder mixture can be provided in the form of a green-state part or mixture comprising diamond powder that is combined with a binding agent to provide a conformable material product, e.g., in the form of diamond tape or other formable/conformable diamond mixture product to facilitate the manufacturing process. In the event that the diamond powder is provided in the form of such a green-state part, it is desirable that a preheating step take place before HPHT consolidation and sintering to drive off the binder material. In an example embodiment, the PCD material resulting from the above-described HPHT process may have diamond volume content in the range of from about 85 to 95 percent.

The diamond powder mixture or green-state part is loaded into a desired container for placement within a suitable HPHT consolidation and sintering device. The HPHT device is activated to subject the container to a desired HPHT condition to effect consolidation and sintering of the diamond powder. In an example embodiment, the device is controlled so that the container is subjected to a HPHT process having a pressure of 5,000 MPa or greater and a temperature of from about 1,350° C. to 1,500° C. for a predetermined period of time. At this pressure and temperature, the catalyst material melts and infiltrates into the diamond powder mixture, thereby sintering the diamond grains to form PCD. After the HPHT process is completed, the container is removed from the HPHT device, and the so-formed PCD material is removed from the container.

In the event that a substrate is used during the HPHT process, e.g., as a source of the catalyst material, the substrate is preferably removed prior to treating the PCD material to remove the catalyst material therefrom to form TSP. Alternatively, the substrate can be removed during or after the treatment to form TSP. In a preferred embodiment, any substrate is removed prior to treatment to expedite the process of removing the catalyst material from the PCD body.

The term "removed", as used with reference to the catalyst material after the treatment process for forming TSP, is understood to mean that a substantial portion of the catalyst material no longer resides within the remaining diamond bonded body. However, it is to be understood that some small amount of catalyst material may still remain in the resulting diamond bonded body, e.g., within the interstitial regions and/or adhered to the surface of the diamond crystals. Additionally, the term "substantially free", as used herein to refer to the catalyst material in the diamond bonded body after the treatment process, is understood to mean that there may still be some small/trace amount of catalyst material remaining within the TSP material as noted above.

In an example embodiment, the PCD body is treated to render the entire body substantially free of the catalyst material. This can be done, by subjecting the PCD body to chemical treatment such as by acid leaching or aqua regia bath, electrochemical treatment such as by electrolytic process, by liquid metal solubility, or by liquid metal infiltration that sweeps the existing catalyst material away and replaces it with another noncatalyst material during a liquid phase sintering process, or by combinations thereof. In an example embodiment, the catalyst material is removed from the PCD body by an acid leaching technique, such as that disclosed for example in U.S. Pat. No. 4,224,380.

FIG. 1 illustrates a section of the diamond bonded/TSP body 10 resulting from the removal of the catalyst material therefrom. The TSP body has a material microstructure comprising a polycrystalline diamond phase made up of a plurality of diamond grains or crystals 12 that are bonded together, and a plurality of interstitial regions 14 that are disposed between the bonded together diamond grains, and that exist as empty pores or voids within the material microstructure, as a result of the catalyst material being removed therefrom.

Figure 2:
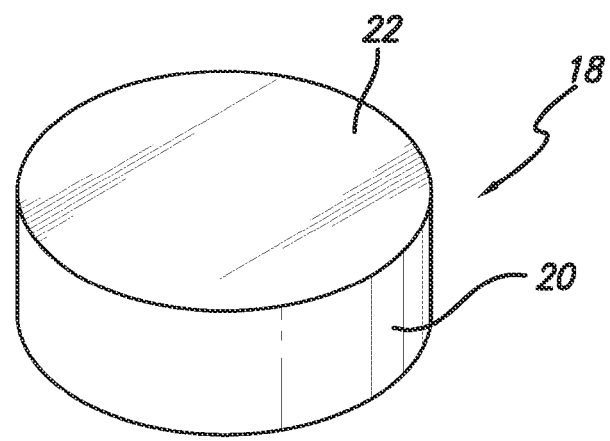
FIG. 2 is a perspective view of the diamond bonded body after it has been treated to remove the catalyst material used to form the same therefrom.

FIG. 2 illustrates an example embodiment of the TSP body 16 wherein the TSP body includes a top surface 22 extending along the diamond table, and a side surface 24 that extends along a wall portion of the body. The TSP body comprises a working surface that may include all or a portion of the top and/or side surfaces, depending on the particular end-use application. While the TSP body illustrated in FIG. 2 is in the form of a wafer or disc that has a generally cylindrical side surface and flat top and bottom surfaces, it is to be understood that TSP bodies that are configured differently are intended to be within the scope of this invention. Additionally, the TSP body 16 may include one or more surface features provided to facilitate use of the construction in its end-use application. For example, the TSP body may at this stage of processing include a chamfer or a beveled surface section between the top and side surfaces, e.g., extending circumferentially around an edge of the top surface, and such surface can be a working surface.

The so-formed TSP body is treated prior to being brazed to a substrate, which can be provided in the form of part that is separate from the end-use device, such as a substrate that is conventionally used for making PCD compacts, or can be in the form of the end-use device itself. The TSP body is treated to enhance its wettability and bonding to a substrate when the substrate is attached thereto by braze or welding process, i.e., by a braze joint.

In an example embodiment, the TSP body is treated such that a surface of the body, that will interface with or be positioned adjacent to a desired substrate, includes a material that operates to facilitate and/or enhance the subsequent attachment with the substrate. The treatment can be one that provides a surface coating of a material onto a surface of the TSP body that interfaces with the substrate and/or that introduces a material into a region of the TSP body extending a depth from the substrate interface surface. Such introduction of wetting material can be into a partial region of the TSP body, i.e., partial infiltration, or into the entire region of the TPS body, i.e., total infiltration.

Wetting or metalizing materials useful for this treatment can include metallic materials, metals, metal alloys, and the like. Thus this treatment process can be referred to as metallizing. The following additional types of materials can also be used; materials capable of forming carbides by reaction with the diamond in the TSP body during HPHT processing; non-carbide forming materials; and ceramic materials. It is desired that the material used for this treatment be one that produces a TSP surface having a greater degree of wettability to a braze material than that of untreated or conventional TSP, and that produces a subsequent brazed attachment with a substrate having an enhanced bond strength, when compared to conventional untreated TSP bodies that are attached to substrates using conventional braze techniques. If desired, such materials can also operate as a barrier to impair or prevent unwanted migration or infiltration of material into the TSP body from the braze material and/or substrate, e.g., during the attachment process.

As noted above, the wetting material is used to facilitate attachment between the TSP body and substrate, and can also be used to prevent any unwanted migration or infiltration of material into the TSP body. Additionally, the wetting material can help to accommodate any mismatch in mechanical properties that exist between the TSP body, the braze material, and the substrate, e.g., differences in thermal expansion characteristics, that may create high residual stresses in the construction during the attachment process. The type of material selected as the wetting material will depend on such factors as the material composition of the ultra-hard material body and/or substrate and/or braze material, and the desired strength or type of bond to be formed therebetween for a certain application.

The metals and/or metal alloys useful for treating the TSP body may include braze alloys, such as those used to subsequently join the TSP body to the substrate, one or more components of such braze alloys, and/or braze alloys other than those used to join together the TSP body and substrate. Examples of metals and/or metal alloys useful for improving the braze joint by infiltrating into the TSP body include those having a melting temperature within the HPHT window for the diamond stable region and can be selected from those described below useful for forming the braze material.

Carbide forming materials suitable for use as the wetting material include those that are capable of carburizing or reacting with carbon, e.g., diamond, in the TSP or ultra-hard material body during HPHT conditions. Suitable carbide forming materials include refractory metals such as those selected from Groups IV through VII of the Periodic table, and Re.

When placed adjacent the ultra-hard material body and subjected to HPHT conditions, such refractory metals may diffuse into the adjacent ultra-hard body and undergo reaction with carbon present in the body to form carbide. This carbide formation operates to provide a degree of bonding between the ultra-hard material body and the braze joint.

A feature of such carbide forming materials useful as a wetting material is that they be capable of forming a bond with the ultra-hard material body and ideally with both the body and the braze joint. Further, the use of such carbide forming material can operate as a barrier layer to protect against unwanted migration or infiltration of any braze joint and/or substrate constituents into the ultra-hard material body.

Ceramic materials useful for forming a wetting material or layer include those capable of undergoing a desired degree of plastic deformation during HPHT conditions to provide a desired mechanical interlocking bond between the ultra-hard body material and the braze joint, e.g., during substrate attachment. Example ceramic materials include TiC, $Al_2O_3$, $Si_3N_4$, SiC, SiAlON, TiN, $ZrO_2$, WC, $TiB_2$, AlN, $SiO_2$, and also $Ti_xAlM_Y$ (where x is between 2-3, M is carbon or nitrogen or a combination of these, and y is between 1-2). Like the carbide forming materials, a feature of ceramic materials useful for forming the wetting material is that they also be capable of forming a bond with the ultra-hard material body and with the braze joint, e.g., by HPHT process. Such ceramic materials can also act as a barrier layer to protect against unwanted migration or infiltration of constituents into the ultra-hard material body from the braze material or substrate.

Non-carbide forming materials useful as the wetting material include non-refractory metals and high-strength braze alloys that do not react with carbon in the ultra-hard material body and, thus do not form a carbide. A desired characteristic of such non-refractory metals and high-strength braze alloys is that they be capable of infiltrating into the ultra-hard material body during HPHT conditions, e.g., during an attachment process. These materials are not required to have a melting temperature below the catalyst material used to form the original TSP body, since the original catalyst material has already been removed therefrom. Such non-carbide forming material should be stable during subsequent brazing or substrate attachment process.

Suitable non-refractory metals and high-strength braze alloys include copper, Ni—Cr alloys, and brazes containing high percentages of elements such as palladium and similar high strength materials, and Cn-based active brazes. A particularly preferred non-refractory metal useful as a wetting material is copper due to its relatively low melting temperature and its ability to form a bond of sufficient strength with the diamond body. Titanium braze alloys may alloy some active carbide forming during infiltration.

While the wetting material or layer is useful for forming a desired bond between the ultra-hard material body and the braze joint, as noted above in certain circumstances it is also desired that the intermediate material be useful as a barrier layer to prevent the undesired migration or infiltration of materials contained within the braze joint and/or substrate to the ultra-hard material body. For example, when the substrate used is one that is formed from a cermet material including a Group VIII metal of the Periodic table, e.g., WC—Co, it is desired that wetting material function to prevent any unwanted infiltration of the solvent metal catalyst, i.e., Co, into the ultra-hard material body. Such infiltration is undesired as it would operate to adversely impact the thermal stability of the ultra-hard material body, e.g., especially in the case where it comprises thermally stable diamond.

The wetting material can be provided in the form of a preformed layer, e.g., in the form of a foil or the like. Alternatively, the wetting material can be provided in the form of a green-state part, or can be provided in the form of a coating that is applied to one or both of the interface surfaces of the ultra-hard material body and the braze joint. In an example embodiment, the wetting material can be applied by chemical vapor deposition. It is to be understood that one or more layers of the wetting material can be used to achieve the desired bonding and/or barrier and or mechanical properties between the ultra-hard material body and the braze joint.

In an example embodiment, it is desired that the material selected to treat the TSP body be one that is capable of coating the substrate interface surface of the TSP body, and/or infiltrating into a region of the TSP body adjacent the substrate interface surface, during HPHT processing conditions. The HPHT process used for such treatment is one conducted at pressures and temperatures that are sufficient to cause the desired melting of the selected material and treatment of the TSP body within the diamond stable pressure and temperature window.

Figure 3:
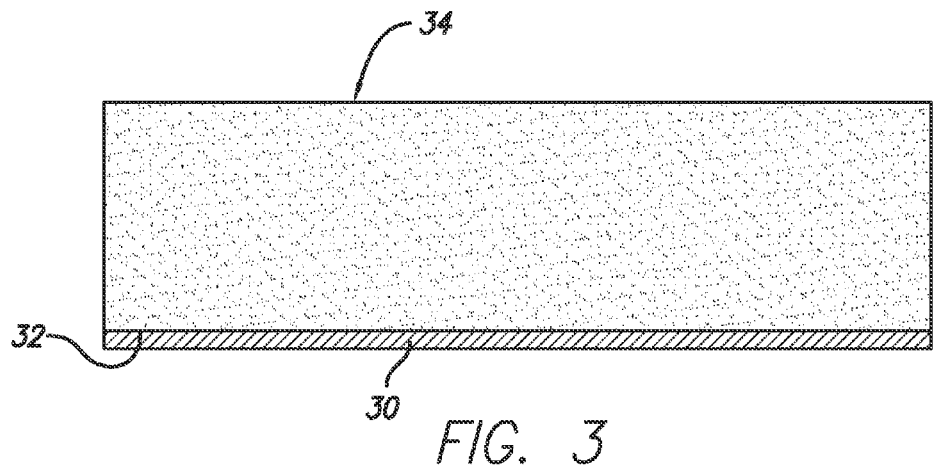
FIG. 3 is a cross-sectional side view of a diamond bonded body comprising a wetting material positioned adjacent a substrate interface surface.

FIG. 3 illustrates an example embodiment of the invention at a stage of processing where a layer of the wetting or metallic material 30 has been positioned adjacent to a substrate interfacing surface 32 of the TSP body 34 for purpose of subsequent HPHT processing. The wetting material 30 can be provided in the form of a powder layer, a green state part, an already sintered part, or a preformed film. In the example embodiment illustrated in FIG. 3, the wetting material 30 is provided in the form of a powder layer or a foil. The amount of wetting material 30 that is provided will depend on whether only a surface coating along the substrate interface surface 32 is desired, or whether it is desired to form an infiltrated region in the TSP body extending a depth from the substrate interface surface. Whether a surface layer or infiltrated region is desired will depend on a number of factors such as the type of substrate and braze material that is used, as well as the end-use application.

A treatment providing a coated surface may be desired in instances where maximum thermal protection of the TSP cutting edge or working surface is required. An additional barrier layer coating can optimize the thermal gradient into the TSP body and thereby prolong cutting life. In an example embodiment where a coated surface is provided, the coating may extend a depth from the substrate interface surface of the TSP body of from about 1 to 5 microns, preferably from about 5 to 20 microns, and more preferably more than about 20 microns.

A treatment providing an infiltrated region within the TSP body may be desired in instances where the metallizing powder is preferably consolidated and bonded to the TSP body by providing a small amount of braze material, transition metal alloys, or Group VIII materials. In these instances, braze materials and transition metal alloys can be fully infiltrated into the TSP body without damaging the original diamond bonded network or matrix. When these materials are selected, it is desired that they have a thermal expansion rate that is more closely matched to the thermal expansion rate of the diamond than that of the catalyst material that was used to initially sinter the diamond bonded body. By doing so, the subsequent bond strength of the TSP body to the drill bit or substrate can be improved beyond that provided by the original diamond/catalyst system.

When a Group VIII material is selected for use in providing the metallizing layer by infiltrating a region of the TSP body, the volume of the Group VIII material, e.g., provided in the form of a metallizing powder, can be made low enough so that complete infiltration of the empty pores within the TSP body does not occur, e.g., the material may form an infiltrated region that does not extend completely through the TSP body.

In such an embodiment, the TSP body retains desired improved thermally stable properties when compared with the initial diamond/catalyst construction, and provides properties that allow improved attachment methods to bit bodies or substrate materials.

In an example embodiment where an infiltrated region in the TSP body is provided, such region may extend partially into or completely through the TSP body from the substrate interface surface. In the event that the wetting material selected also provides desired mechanical or other properties to the TSP body upon HPHT processing, then infiltration of such material may not be limited only to a region of the body. For example, in the event that the wetting material, in addition to providing enhanced bonding properties, provides improved properties of strength and/or toughness to the TSP body working surface, the complete infiltration of the same may be desired.

In an example embodiment where the infiltrated region extends completely through the TSP body, e.g., where a Group VIII material is used, an improved diamond bonded body can be produced by changing the alloy composition of the infiltrant material from that of the metal catalyst material that was used to initially sinter the diamond bonded body, and that was removed therefrom. As noted above, for example, the infiltrant material may be selected to have thermal properties that more closely match that of the diamond-bonded body than that of the catalyst material used to initially sinter the diamond-bonded body.

If desired, the wetting material may extend only a partial depth into the TSP body from the substrate interface surface and towards a working surface of the TSP body. In an example embodiment, such partial depth can be from about 0.5 to 50 microns from the working surface, preferably from about 0.5 microns to ½ the TSP body thickness from the working surface, or more preferably about 200 to 300 microns away from working surface. It is to be understood that the exact depth that the wetting material extends into the TSP body can and will vary depending within these ranges depending on such factors as the type of wetting material used, and/or the type of braze material used, the size and/or volume content of the diamond grains within the TSP body, and/or the type of substrate that is used. Further, it is to be understood that the working surface can be any surface of the TSP body including but not limited to one or more of a top surface, a side surface, and/or an edge surface interposed between the top and side surfaces.

During subsequent HPHT processing of the TSP body illustrated in FIG. 3, the wetting material provides a desired coating and or infiltrates into a desired region along the substrate interface surface as noted above. The desired coating thickness can alternatively be obtained by machining process after HPHT processing, and the desired infiltration depth can also be achieved by subjecting the TSP body to leaching process after HPHT processing.

Figure 4:
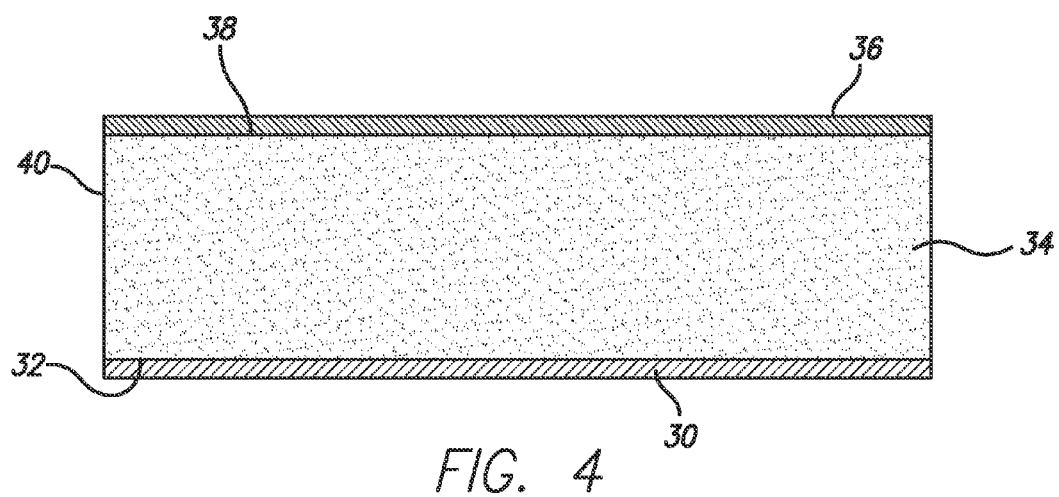
FIG. 4 is a cross-sectional side view of a diamond bonded body comprising a wetting material positioned adjacent a substrate interface surface, and further comprising an optional infiltrant material positioned adjacent a working surface of the body.

FIG. 4 illustrates another example embodiment of the invention wherein the TSP body illustrated in FIG. 3, comprising the wetting material 30 disposed along the substrate interface surface 32, is optionally further processed so that a desired layer of infiltrant material 36 is positioned along a top surface 38 of the TSP body. This optional treatment produces a TSP body, after HPHT processing, comprising both a substrate interface surface having improved wettability for subsequent brazing to a substrate, and a working surface comprising an infiltrant material extending a depth therefrom. The presence of such infiltrant material within a region of the TSP body can provide both enhanced properties of strength and/or toughness to this region of the TSP body and/or can operate as a barrier to block or control the extent of infiltration from the wetting material during the HPHT process, e.g., so that such wetting material does not infiltrate completely to a working surface of the TSP body.

In an embodiment where the wetting material is selected to act as a barrier material, its presence operates to prevent unwanted migration of constituents from the braze joint and/or substrate into the TSP body, thereby making the TSP body available for accommodating infiltration of the infiltrant material. Additionally, the presence of such a barrier wetting material can operate to block unwanted infiltration of the infiltrant material from the TSP body into the adjacent braze joint or substrate.

While the infiltrant material 36 is illustrated in FIG. 4 as being positioned adjacent a top surface of the TSP body, the infiltrant material 36 can alternatively or additionally be positioned along a side surface 40 of the TSP body or any other surface of the body that may or may not be a working surface. The exact placement position for the infiltrant material can and will vary depending on the particular TSP body geometry and the end-use application.

Materials useful for forming the infiltrant material include metals, metal alloys, and carbide formers, i.e., materials useful for forming a carbide reaction product with the diamond in the TSP body during HPHT processing conditions. Example metals and metal alloys include those selected from Group VIII of the Periodic table, examples carbide formers include those comprising Si, Ti, B, and others known to produce a carbide reaction product when combined with diamond at HPHT conditions. The infiltrant material preferably has a melting temperature that is within the diamond stable HPHT window. The infiltrant material can be provided in the form of a powder layer, a green state part, an already sintered part, or a preformed film. In the example embodiment illustrated in FIG. 4, the infiltrant material 36 is provided in the form of a powder layer or a foil.

The amount of infiltrant material 36 that is provided will depend on depth or extent of infiltration during HPHT processing. In an example embodiment, the infiltrant material can extend into the TSP body a depth from the working surface of from about 5 to 100 microns, preferably from about 100 to 500 microns, and more preferably throughout the TSP body, i.e., complete infiltration. The infiltrant can extend partially or completely through the TSP body. The exact depth that the infiltrant material extends within the TSP body is understood to vary within these ranges depending on such factors as the type of material used as the infiltrant material, the size and volume content of diamond grains forming the TSP body, the placement position of the working surface, and the end-use application.

Figure 5:
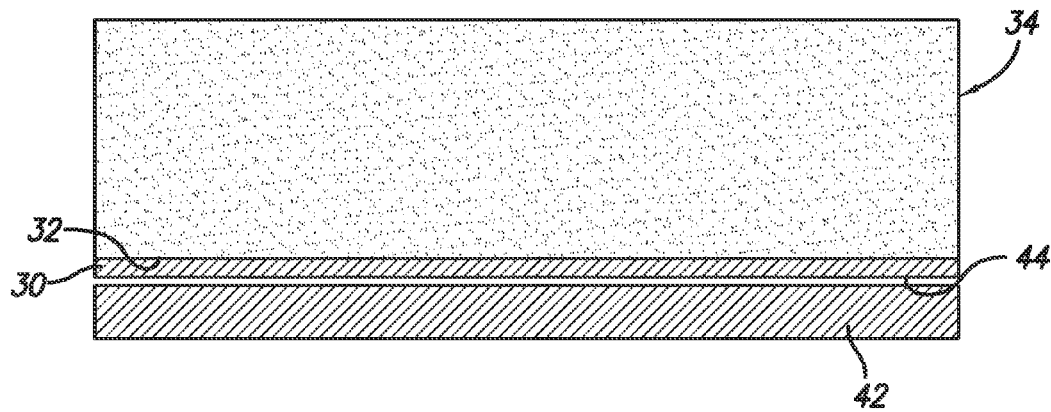
FIG. 5 is a cross-sectional side view of a diamond bonded body comprising a wetting material positioned adjacent a substrate interface surface, and further comprising a braze attachment layer positioned adjacent the wetting material.

FIG. 5 illustrates another embodiment of the invention wherein the TSP body illustrated in FIG. 3, comprising the wetting material 30 disposed along the substrate interface surface 32, is optionally further processed so that a braze attachment layer 42 is positioned along bottom surface 44 of the wetting material 30. The optional placement of a braze attachment layer 42 produces a TSP body, after HPHT processing, comprising a braze interface surface providing a further enhanced degree of attachment between the TSP body and a desired substrate. The optional braze attachment layer can be used with either embodiments of the TSP body where the wetting material is provided in the form of a coating or in the form of an infiltrated region.

Materials useful for forming the braze attachment layer includes metals, metal alloys, cermet materials, and the like. The braze attachment layer can be provided in the form of a powder layer, a green state part, an already sintered part, or a preformed film. In the example embodiment illustrated in FIG. 5, the braze attachment layer 42 is provided in the form of a preformed part, e.g., a thin metal disc.

In an example embodiment, it is desired that the braze attachment layer have material and/or physical properties that closely match that of the braze material used to join the TSP body to the substrate to assist in forming a strong attachment therebetween. Example braze attachment layer materials include Mo, Ti, W, binderless WC, Cu and other metals and alloys of the same having a criteria that the melting point of such braze attachment layer be higher than the material being used to attached the braze attachment layer to the TSP body. The type of material used to form the braze attachment layer will depend on the type of braze material and/or substrate that is used.

Functionally, it is desired that the braze attachment layer have a high degree of flatness to facilitate subsequent brazing. In an example embodiment, the braze attachment layer must be extremely thin so it does not adversely affect the final tolerance on the flatness requirement for subsequent brazing. Alternatively, the braze attachment layer should be sufficiently thick to permit for a secondary machine operation to control and/or obtain a desired flatness. An attachment layer having a higher thickness can decrease the thermal gradient during brazing to cause a lower residual stress in the final assembly. A higher thickness can also allow a high temperature braze material to be used that can improve bond strength while maintaining a similar temperature gradient.

Conventionally, PCD compacts are formed in a single step process, i.e., single HPHT process, using a substrate having thickness of at least 5 mm, wherein the compact diamond table thickness is from 1 to 4 mm, and most commonly 2 to 3 mm. Conventionally, a substrate thickness of about 4 to 16 mm is used to form a PCD compact in a single step process having a diamond table thickness of greater than about 1 mm. In an example embodiment, it is desired that the braze attachment layer have a thickness that is less than about 5 mm, and more preferably less than about 3 mm, even for the thickest TSP bodies. Configured in this manner, the use of such thinner attachment layer saves valuable cell volume in the HPHT apparatus that can be used to facilitate forming multiple metallized TSP constructions when compared to conventional PCD compacts.

The exact thickness of the braze attachment layer is understood to vary depending on such factors as the type of material used as the infiltrant material, the types of materials used for form the braze and/or substrate, the thickness and/or configuration of the TSP body, and on the end-use application.

During subsequent HPHT processing of the TSP body illustrated in FIG. 5, the braze attachment material provides a desired layer thickness on the coated or infiltrated substrate interface surface of the TSP body as noted above. The desired layer thickness can alternatively be obtained by machining process after HPHT processing.

Figure 6:
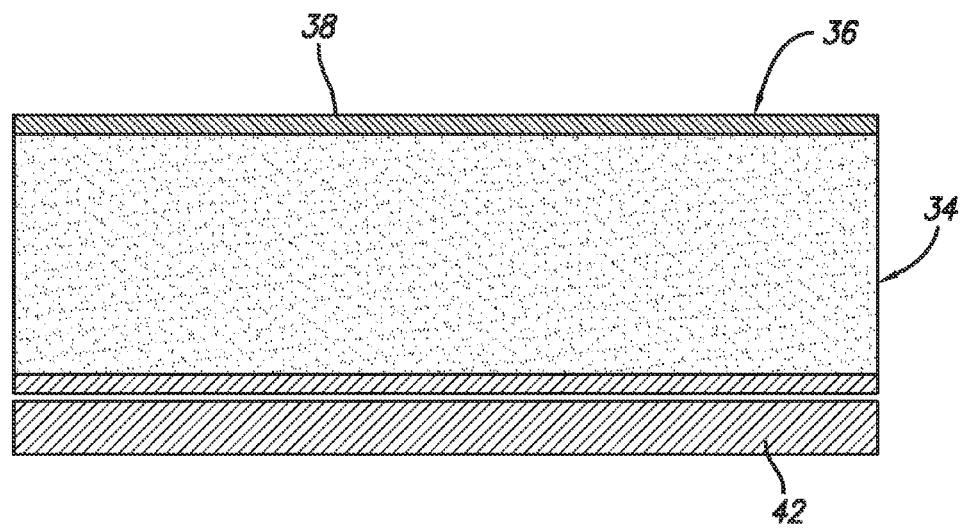
FIG. 6 is a cross-sectional side view of a diamond bonded body comprising a wetting material positioned adjacent a substrate interface surface, a braze attachment layer positioned adjacent the wetting material, and further comprising an infiltrant material positioned adjacent a working surface of the body.

FIG. 6 illustrates an embodiment of the invention wherein the TSP body illustrated in FIG. 5 is further optionally treated to include an infiltrant material 36 positioned along a top surface 38 of the TSP body (similar to the embodiment illustrated in FIG. 4). As described above for the embodiment illustrated in FIG. 4, the infiltrant material provides a infiltrated region during HPHT processing that extends a depth into the TSP body 34 from the working surface, and that can provide enhanced properties of strength and/or toughness and/or operate as a barrier to block or control the extent of infiltration from the wetting material during the HPHT process. The materials used for forming the infiltrant material and depth of the region formed therefrom during HPHT processing is the same as described above for the embodiment illustrated in FIG. 4.

TSP bodies of this invention are made by subjecting the TSP body as assembled comprising the wetting material, any optional infiltrant material, and any optional braze support layer to HPHT conditions that are within the diamond stable region, and that are sufficient to melt the wetting material, optional infiltrant material, and form a desired attachment between the optional braze support layer and the wetted TSP body. TSP bodies of this invention can be subjected to such HPHT processing individually, or multiple TSP bodies can be subjected to the HPHT processing at the same time to enhance manufacturing efficiency.

When processed individually, the TSP body with the wetting material and any optional infiltrant material and/or braze joint material is loaded into a suitable HPHT container or can. The container can be formed from those materials conventionally used to form PCD, such as niobium, tantalum, molybdenum, zirconium, mixtures thereof and the like. The container is then loaded into a HPHT device, such as that used to form conventional PCD, and the device is operated to impose a desired high pressure/high temperature force onto the contents for a designated period of time. During HPHT processing, the pressure and/or temperature can remain constant or can be varied as necessary to facilitate desired processing of the wetting material, infiltrant material, and/or braze joint material.

In an example embodiment, TSP body is subjected to HPHT conditions for the purpose of melting the wetting material and optional infiltrant material for the purpose of forming the desired coating or infiltrated region adjacent the TSP body substrate interface surface, and bonding any optional braze material to the TSP body. In the event that the wetting material or optional infiltrant is a carbide former, the HPHT conditions are also selected to provide a desired amount of carbide formation. The HPHT conditions can vary depending on the type of material selected for the wetting material or optional infiltrant material. In an example embodiment, the one or more containers loaded into the HPHT device is subjected to a pressure of 4,000 Mpa or more, a temperature of from about 900° C. to 1,500° C., for a predetermined period of time of from about 0.5 to 5 minutes.

After processing, the container is removed from the HPHT device and the TSP body is removed from the container and readied for attachment to a substrate. If desired, the TSP body can be machine finished prior to or after attached to a selected substrate. As noted above, the resulting TSP body is attached by braze or welding process to a desired substrate, which can be provided in the form of a part, e.g., a piece of sintered carbide, that is useful for subsequently attaching the resulting TSP construction to an end-use device, or which can be a portion of the end-use device itself, e.g., a socket of a drill bit.

Figure 7:
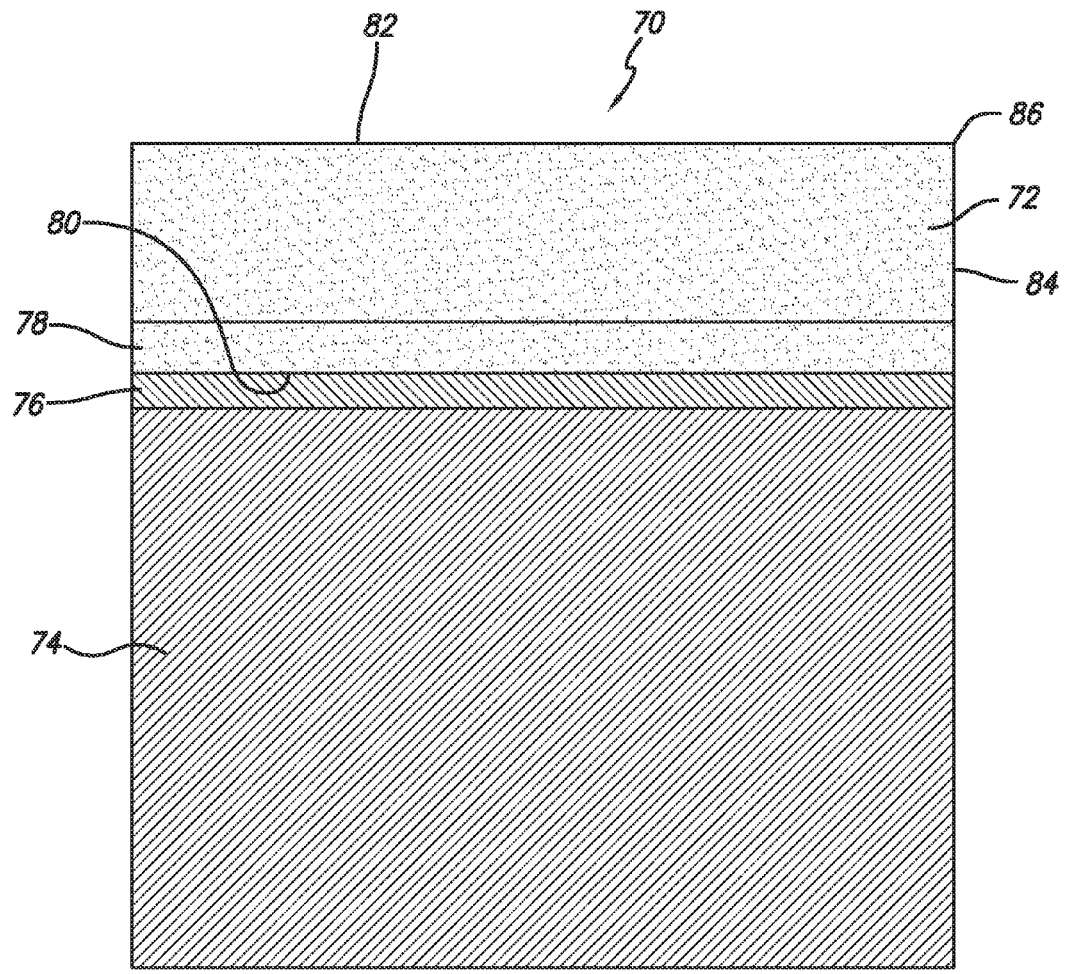
FIG. 7 is a cross-sectional side view of an example embodiment diamond bonded construction of this invention.

FIG. 7 illustrates an example embodiment TSP construction 70 comprising a TSP body 72 that is attached to a substrate 74 via a braze joint 76. TSP body includes a region 78 that extends into the body a depth from the substrate interface surface 80 and that includes the wetting material that has been infiltrated therein during HPHT processing. The depth of region 78 can and will vary as noted above. In this particular example, the region extends a partial depth and does not extend completely through the TSP body. The TSP body includes a working surface that can exist along a top surface 82, a side surface 84, and/or an edge surface 86.

A feature of the TSP body 72 is that the substrate interface surface 80 and the region 78 extending therefrom includes the wetting material, that operates to provide an enhanced attachment with a braze material used to form braze joint 76 when compared to conventional TSP, i.e., TSP that does not include the wetting material. In an example embodiment, the wetting material used in this embodiment can have thermal characteristics that are more closely matched to the diamond bonded crystals in the TSP body than the catalyst material that was used to initially sinter the same.

Example braze materials useful for forming the braze joint include materials that are capable of forming a strong chemical bond between the TSP body and a desired substrate. It is desired that the braze material includes one or more elements that are capable of reacting with one or more elements in the TSP body to form such strong chemical bond. For this reason, materials useful for forming the braze material can be referred to as being "active" braze materials or alloys.

Example materials useful for forming the braze material include those selected from the group including Ag, Au, Cu, Ni, Pd, B, Cr, Si Ti, Mo, Sn, In, V, Fe, Al, Mn, Co, and mixtures and alloys thereof. Active elements in such braze materials include strong carbide formers such as B, Si, Ti, Mo, and V. Other materials useful for forming the braze material include carbide forming metals, refractory transition metals, tungsten, tantalum, molybdenum, and alloys thereof. Other materials useful for this purpose include those in Groups IVA, VA, VIA, VIIA, and alloys and mixtures thereof. Other materials include silicone, titanium, niobium, zirconium, manganese, molybdenum/manganese, tungsten/manganese, tungsten/rhenium, and combinations thereof. The braze joint can be formed by using conventional braze techniques such as by vacuum brazing, induction brazing, and the like.

As noted above, the substrate 74 can be provided in the form of a part that is separate from the end-use device, such as a cermet or carbide part, or can be provided in the form a portion of the end-use device itself. Accordingly, it is to be understood that TSP bodies that have been treated in the manner described above can be attached directly or indirectly to the end-use device.

Suitable substrates that are provided separate from the end-use device can be selected from those materials typically used as substrates for forming PCD compacts, and can include metallic materials, ceramic material, cermet materials, and combinations thereof. An example substrate is one that is a carbide, such as one formed from WC—Co. The size and configuration of the substrate can and will vary depending on the size and configuration of the TSP body and the end-use application.

Figure 8:
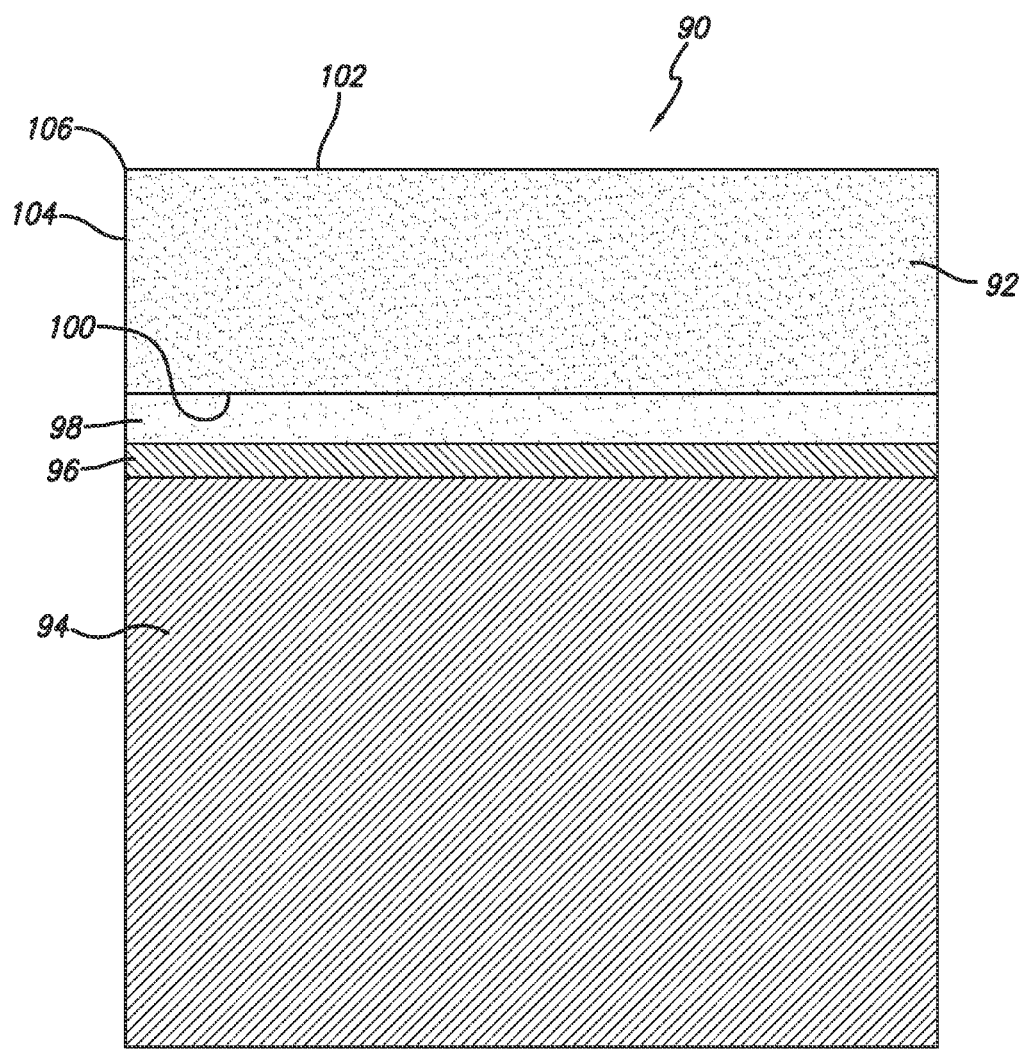
FIG. 8 is a cross-sectional side view of another example embodiment diamond bonded construction of this invention.

FIG. 8 illustrates another example embodiment TSP construction 90 comprising a TSP body 92 that is attached to a substrate 94 via a braze joint 96. The TSP body includes a layer 98 that extends a distance outwardly from the a substrate interface surface 100 of the body and that includes the wetting material that has been disposed thereon during HPHT processing. The thickness of the layer or coating 98 can and will vary as noted above. The TSP body includes a working surface that can exist along a top surface 102, a side surface 104, and/or an edge surface 106 of the body.

The layer 98 formed from the wetting material operates to provide an enhanced attachment with a braze material used to form braze joint 96 when compared to conventional TSP, i.e., TSP that does not include the wetting material. The braze materials used to form the braze joint 98, and the metallic material used to form the substrate, can be the same as those described above. In the example embodiment illustrated in FIG. 8, the braze joint is formed using tungsten powder, binderless WC/MoC, and tungsten/rhenium powders. This material mixture is one that displays superior thermal matching characteristic for rebonding the TSP body to a bit body or substrate during the subsequent brazing operation.

Figure 9:
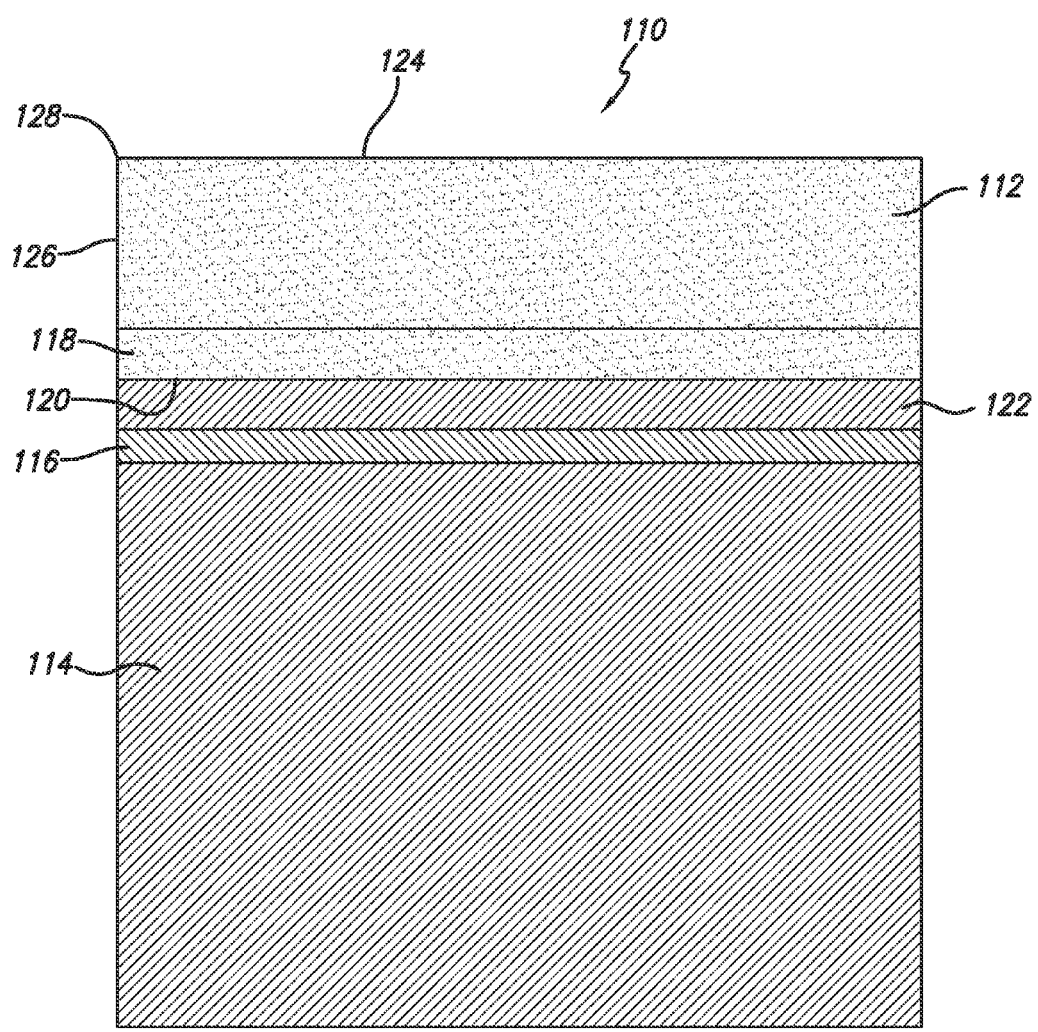
FIG. 9 is a cross-sectional side view of another example embodiment diamond bonded construction of this invention.

FIG. 9 illustrates another example embodiment TSP construction 110 comprising a TSP body 112 that is attached to a substrate 114 via a braze joint 116. The TSP body includes a region 118 that extends a depth inwardly from the substrate interface surface 120 of the body and that includes the wetting material that has infiltrated therein during HPHT processing. The depth of the region 118 can and will vary as noted above. The TSP body includes a working surface that can exist along a top surface 124, a side surface 126, and/or an edge surface 128 of the body.

This particular embodiment further comprises a braze attachment layer 122 that is formed from the materials noted above and that is attached to the TSP body during HPHT processing. The braze attachment layer 122 is interposed between the wetted region 118 and the braze joint 116, and operates to improve the attachment strength therebetween. The braze materials used to form the braze joint 116, and material used to form the substrate, can be the same as those described above.

Figure 10:
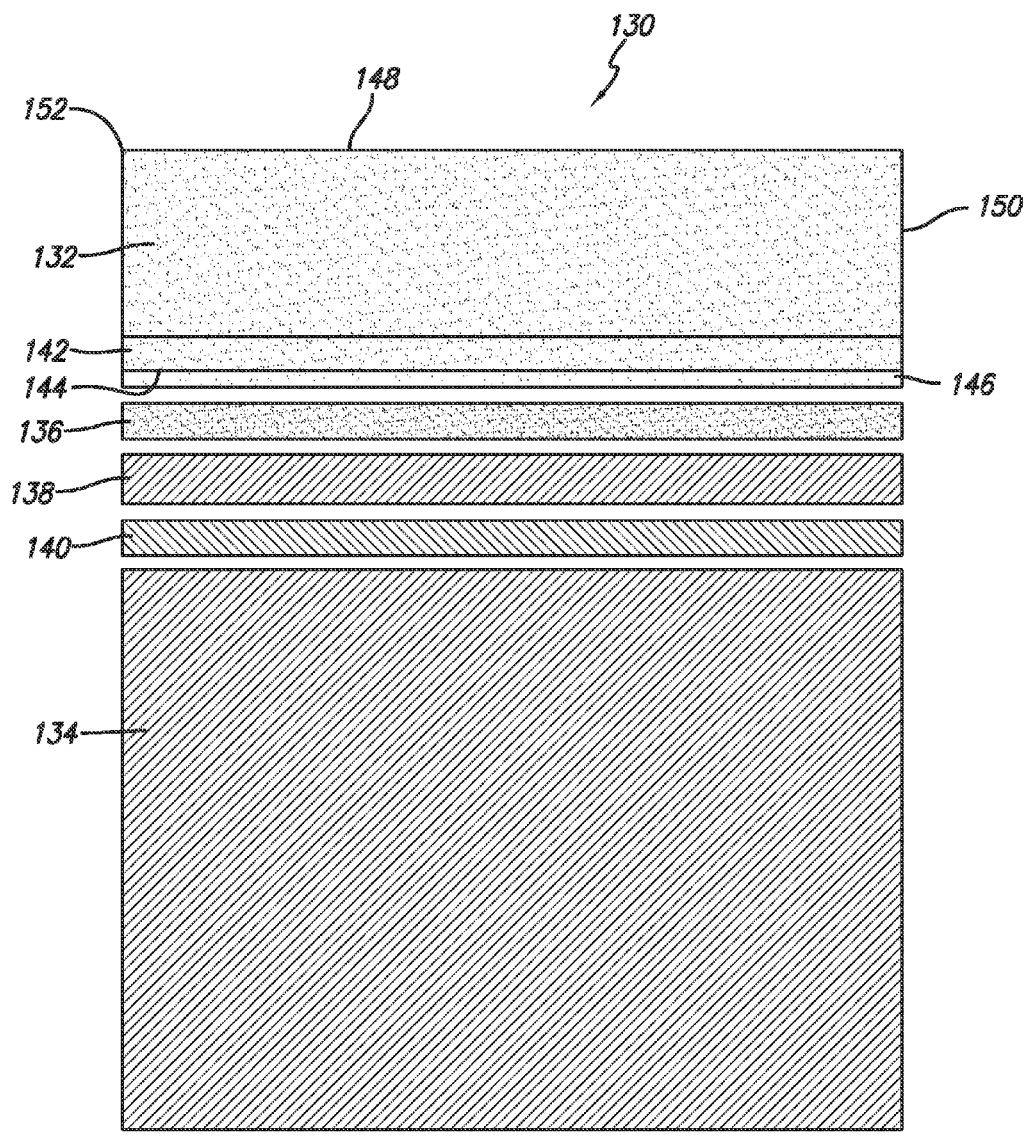
FIG. 10 is a cross-sectional side view of another example embodiment diamond bonded construction of this invention.

FIG. 10 illustrates another example embodiment TSP construction 130 comprising a TSP body 132 that is attached to a substrate 134 via a first braze joint 136, and intermediate layer 138, and a second braze joint 140. The TSP body may include a region 142 that extends a depth inwardly from the substrate interface surface 144 of the body and that includes the wetting material that has infiltrated therein during HPHT processing and/or may include a layer 146 of wetting material that has been disposed along the substrate interface surface 144 of the body during the HPHT processing. The depth of the wetted region 142 and/or the thickness of the wetted layer 146 can and will vary as noted above. The TSP body includes a working surface that can exist along a top surface 148, a side surface 150, and/or an edge surface 152 of the body.

The first braze joint 136 can be formed from the same braze material noted above, and in a preferred embodiment on that is "active" and forms a bond with the adjacent TSP body. This particular embodiment comprises an intermediate layer 138 that can be provided in the form of a rigid preformed element or part, and is formed from a material that is readily brazable by both the materials used to form the first and second braze joints.

Materials useful for forming the intermediate layer 138 include refractory metals, ceramic materials, cermets, and combinations thereof. The intermediate layer may or may not have a thermal expansion characteristic that is between that of the TSP body and the substrate. It is also desired that the material used to form the intermediate layer not react with any active element in the first braze material selected to react with the TSP body. Additionally, it is desired that the material selected for forming the intermediate layer have a melting temperature that is greater than that of the materials used to form the first and second braze joints, and have no or very limited solubility in both the first and second braze materials. Example materials include Ta, W, Mo, Nb and alloys thereof, other refractory metals, ceramic materials, and combinations thereof. In an example embodiment where the first braze joint is formed from a copper-based alloy having titanium as an active element, it is desired that the intermediate layer be formed from the Ta, W, Mo, Nb and alloys thereof noted above.

While the intermediate layer 138 is illustrated in the form of a solid disc-shaped structure, it is to be understood that the intermediate layer can be configured differently as called for by the particular end-use application. For example, the intermediate layer can be provided in the form of a part having an upper and/or a bottom surface that are nonplanar, e.g., that include one or more surface features giving rise to a nonplanar configuration. The use of such a nonplanar upper and/or lower surfaces can operate to increase the surface area of the intervening layer to thereby improve the strength within the two bond joints. The use of nonplanar upper and/or lower surfaces can also operate to make crack propagation along one or both of the first and second braze joints more difficult.

Further, the intermediate layer can be formed from a part having one or more holes or openings disposed partially or completely therethrough. The presence of such holes or openings within one or both of the upper and lower surfaces can operate to improve the strength of the first and/or second bond joints by virtue of one or both of the first and second braze materials penetrating the holes or openings. Additionally, in the case where the intermediate layer includes one or more holes extending completely therethrough, the penetration of the first and second braze materials into each other in the hole area can produce nonuniformity or residual thermal stress in the resulting braze joints, thereby contributing to increased strength of the braze joints.

Still further, the intermediate layer can be formed from a part characterized by a plurality of perforations, e.g., provided in the form of a wire mesh or the like. An intermediate layer provided in this form would produce both types of benefits noted above for the intermediate layer with a nonplanar interface and with holes or openings. Additionally, a mesh intermediate layer would provide a strong mechanical interlocking between the intermediate layer and the braze joints. Further, the use of such a mesh embodiment of the intermediate layer could provide improved intermediate layer strength if the material used to form the mesh is brittle.

The second braze joint 140 can be formed from a material that is the same or different from that used to form the first braze joint. In an example embodiment, the material that is used to form the second braze joint is different from that used to form the first braze joint, and is specially formulated to form an optimal bond with the substrate. The term "different" as used to describe the first and second braze joint materials is understood to cover situations where the braze materials may comprise an alloy formed from the same general elements but in different proportions, as well as comprising an alloy including one or more different elements. In an example embodiment, the second braze material does not include an active element that is a strong carbide former. Example materials useful for forming the second braze material include those selected from the group including Ag, Au, Sn, Cu, Ni, Pd, In, Cr, Fe, Al, Mn, Co, and mixtures and alloys thereof.

It is to be understood that the specific choice of material that will be used to form the second braze joint will depend on such factors as the types of materials used to form the intermediate layer and the substrate, as well as the particular end-use application. Additionally, it is to be understood that the thicknesses of the first and second braze joints can be the same or different.

While particular example embodiment TSP constructions have been disclosed above and illustrated in FIGS. 7 to 10, it is understood that variations of these example embodiment are understood within the scope of the invention. For example, while the examples illustrated in FIGS. 7 to 10 do not include a TSP body comprising an infiltrant region extending a depth into the body from a working surface, it is to be understood that such embodiment are within the scope of this invention.

A feature of ultra-hard and metallic constructions of this invention is that the TSP body included therein has been treated at HPHT conditions to form a wetted region and/or layer that is positioned along a substrate interface surface, which region and/or surface operates to provide an improved degree of bond strength to a braze joint between the TSP body and a substrate, when compared to conventional TSP that does not include such wetted region and/or layer. A further feature of constructions of this invention is that the TSP body may additionally comprise an infiltrant region formed during HPHT conditions that extends a depth from a working surface and that enhances one or more physical or mechanical properties of the TSP construction.

Ultra-hard and metallic constructions of this invention can be used in a number of different applications, such as tools for mining, cutting, machining, milling and construction applications, wherein properties of shear strength, thermal stability, wear and abrasion resistance, mechanical strength, and/or reduced thermal residual stress are highly desired. Constructions of this invention are particularly well suited for forming working, wear and/or cutting elements in machine tools and drill and mining bits such as roller cone rock bits, percussion or hammer bits, diamond bits, and shear cutters used in subterranean drilling applications.

Figure 11:
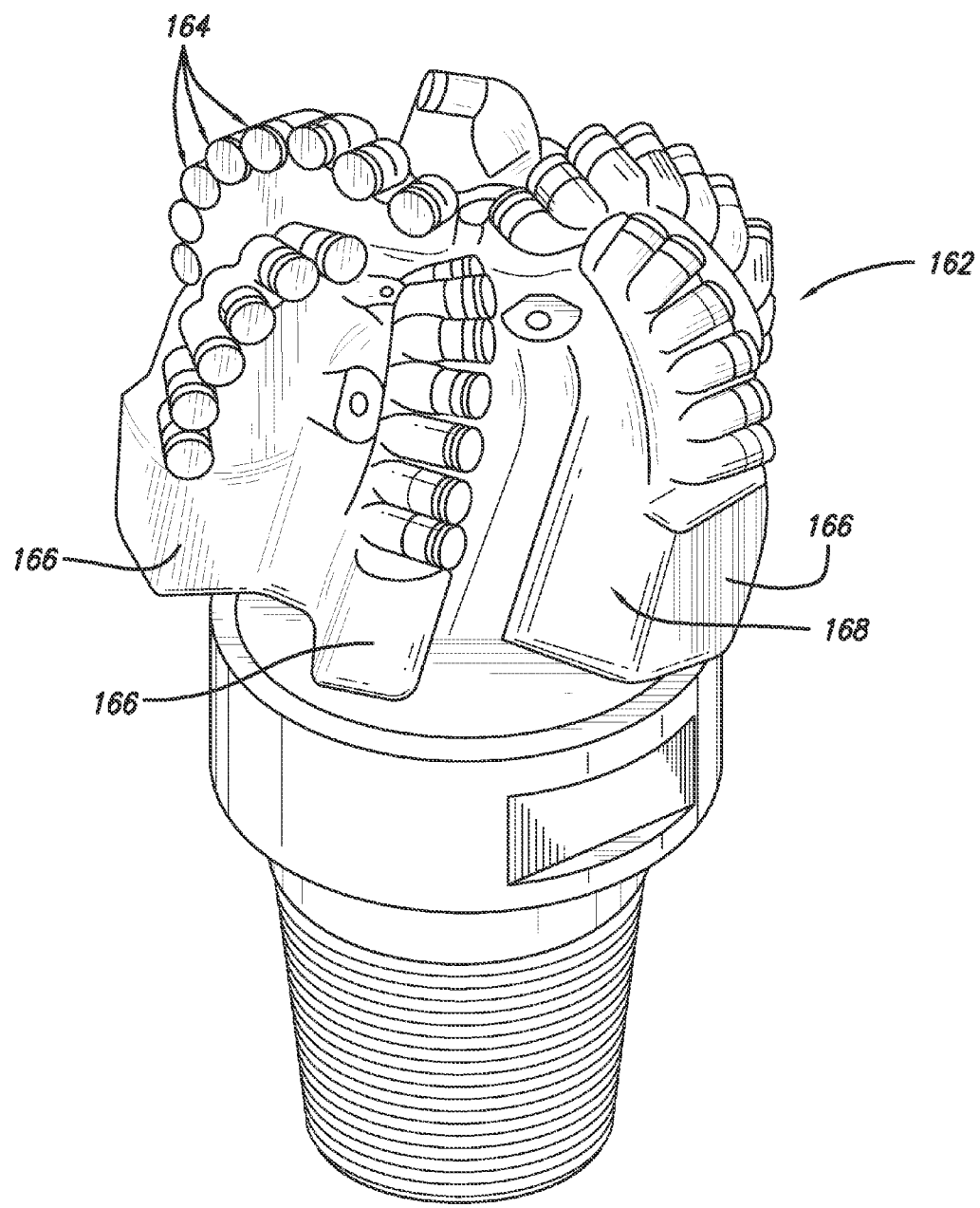
FIG. 11 is a perspective side view of a drag bit comprising a number of the ultra-hard and metallic constructions of this invention provided in the form of a shear cutter.

FIG. 11 illustrates a drag bit 162 comprising a plurality of cutting elements made from ultra-hard and metallic constructions of this invention configured in the form of shear cutters 164. The shear cutters 164 are each attached to blades 166 that extend from a head 168 of the drag bit for cutting against the subterranean formation being drilled. The shear cutters 164 are attached by conventional welding or brazing technique to the blades and are positioned to provide a desired cutting surface.

Figure 12:
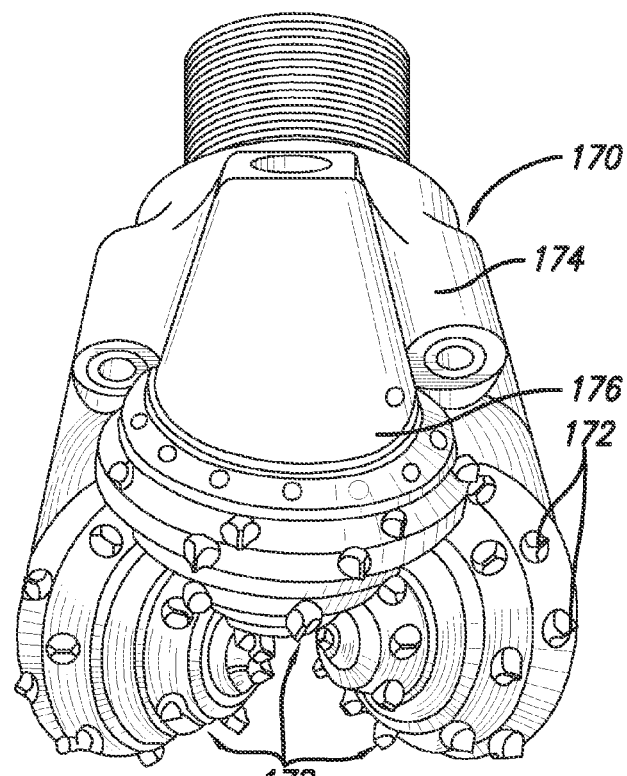
FIG. 12 is a perspective side view of a rotary cone drill bit comprising a number of the ultra-hard and metallic constructions of this invention provided in the form of inserts.

FIG. 12 illustrates a rotary or roller cone drill bit in the form of a rock bit 170 comprising a number of the ultra-hard and metallic constructions of this invention provided in the form of wear or cutting inserts 172. The rock bit 170 comprises a body 174 having three legs 176, and a roller cutter cone 178 mounted on a lower end of each leg. The inserts 172 can be formed according to the methods described above. The inserts 172 are provided in the surfaces of each cutter cone 178 for bearing on a rock formation being drilled. In an example embodiment, the inserts can be positioned along the gage and/or heel row of the drill bit.

Figure 13:
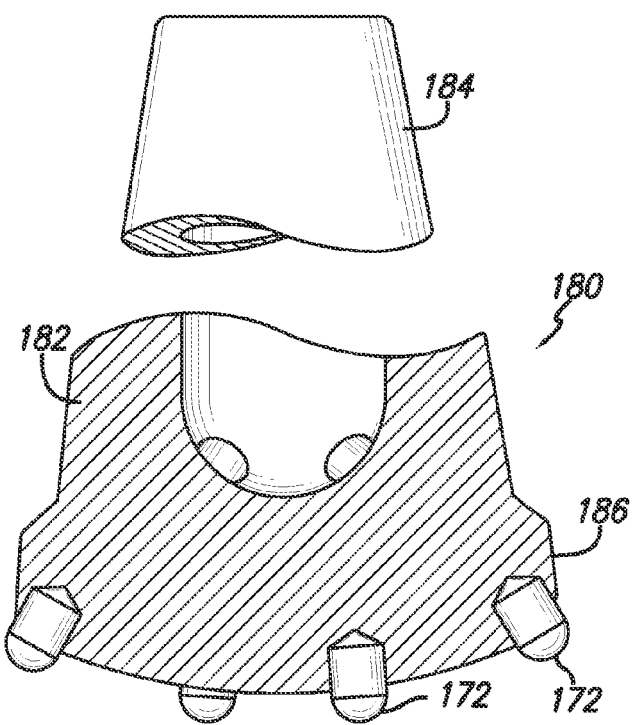
FIG. 13 is a perspective side view of a percussion or hammer bit comprising a number of the ultra-hard and metallic constructions of this invention provided in the form of inserts.

FIG. 13 illustrates the inserts described above as used with a percussion or hammer bit 180. The hammer bit comprises a hollow steel body 182 having a threaded pin 184 on an end of the body for assembling the bit onto a drill string (not shown) for drilling oil wells and the like. A plurality of the inserts 172 are provided in the surface of a head 186 of the body 182 for bearing on the subterranean formation being drilled.

Other modifications and variations of ultra-hard and metallic constructions of this invention will be apparent to those skilled in the art. It is, therefore, to be understood that within the scope of the appended claims, this invention may be practiced otherwise than as specifically described.

What is claimed is:

1. A diamond bonded construction comprising:
a body comprising a plurality of bonded together diamond grains with interstitial regions disposed between the diamond grains, wherein the interstitial regions are substantially free of a catalyst material used to initially form the body at high pressure/high temperature conditions, the body having a top surface and a bottom surface opposite the top surface;
a carbide wetting material disposed along the body bottom surface and extending therefrom at least a partial depth into the body;
a braze joint disposed between the carbide wetting material and a single metallic substrate, the braze joint being formed from a braze material, wherein the braze material is different from the wetting material and is capable of forming an attachment between the substrate and wetting material at elevated temperature conditions in the absence of elevated pressure during a process independent of one used to apply the wetting material to the body.

2. The construction as recited in claim 1 wherein the partial depth is in the range of from about 0.5 to 50 micrometers.

3. The construction as recited in claim 1 wherein the partial depth is in the range of from 0.5 micrometers to ½ of the total axial thickness of the diamond body.

4. The construction as recited in claim 1 wherein the partial depth is such that the diamond body is substantially free of the wetting material within a region extending about 200 to 300 micrometers or less from a working surface opposite the bottom surface.

5. The construction as recited in claim 1 wherein a population of the interstitial regions includes an infiltrant material disposed therein.

6. The construction as recited in claim 5 wherein the population of the interstitial regions comprising the infiltrant material extends a partial depth from a working surface of the body.

7. The construction as recited in claim 5 wherein the population of the interstitial regions comprising the infiltrant material extends from a working surface of the body to the wetting material.

8. The construction as recited in claim 1 wherein the braze joint comprises two or more different braze material layers.

9. The construction as recited in claim 8 wherein the braze joint further comprises an intermediate metal layer interposed between the different braze material layers.

10. The construction as recited in claim 1 comprising a further wetting material that is interposed between the existing wetting material and the braze joint.

11. The construction as recited in claim 10 wherein the existing and further wetting materials are different from one another.

12. The construction as recited in claim 1 wherein the wetting material is disposed on only the bottom surface of the body.

13. The construction as recited in claim 1 wherein the at least a partial population of the interstitial regions is filled with an infiltrant material that is different than the metallic material.

14. The construction as recited in claim 13 wherein the wetting material is a carbide-forming material.

15. A bit for drilling subterranean earthen formations comprising a body and a number of cutting elements operatively attached to the body, wherein at least one of the cutting elements comprises the construction as recited in claim 1.

16. A bit for drilling subterranean formations, the bit comprising a bit body comprising a plurality of cutting elements attached thereto, the cutting elements comprising:
a body comprising a plurality of bonded together diamond grains with interstitial regions disposed between the diamond grains, wherein the interstitial regions are substantially free of a catalyst material used to initially form the body at high pressure/high temperature conditions;
a carbide wetting material disposed along a bottom surface of the body and extending a partial depth into the body;
a metallic substrate attached to the body along the bottom surface; and a braze joint interposed between the wetting material and the substrate, wherein the braze joint is formed from a braze material that is different from the wetting material and that is capable of forming an attachment between the wetting material and the substrate at elevated temperature in the absence of elevated pressure.

17. The bit as recited in claim 16 comprising a number of blades extending from the bit body, and wherein the cutting elements are disposed on the blades.

18. The bit as recited in claim 16 comprising a number of legs extending from the bit body, and a cone rotatably disposed on each respective leg, wherein the cutting elements are disposed on the cones.

19. The bit as recited in claim 16 wherein the wetting material is disposed on only the bottom surface of the body.

20. The bit body as recited in claim 19 wherein the cutting element comprises a single metallic substrate, and wherein the substrate is attached body along only the body bottom surface.

21. A diamond bonded construction comprising:
a polycrystalline diamond body comprising interstitial regions substantially free of a catalyst material used to initially form the body at high pressure/high temperature conditions;
a metallic substrate attached to the body;
a braze joint formed interposed between the body and the substrate; and
a carbide wetting material interposed between the body and the braze joint and formed from a material different from the braze joint wherein the carbide wetting material is disposed a partial depth into the body and provides a barrier layer to block infiltration of a metal constituent from the braze joint or substrate, and wherein the braze joint is formed from a braze material different from the wetting material and capable of forming an attachment bond between the substrate and the body at elevated temperature in the absence of elevated pressure.

* * * * *